United States Patent [19]
Tanguy et al.

[11] 3,714,888
[45] Feb. 6, 1973

[54] MACHINE FOR COOKING EGGS AND MINCED MEATS

[76] Inventors: Pierre Tanguy, 19 rue de France, 95 S'Ouen P'Aumoue; Pierre Carre, 58 rue Y. Tonnjuene, P. 78 Bongival; Jean Le Boulbouech, 6 rue Blangin, Lorient, all of France

[22] Filed: March 19, 1971

[21] Appl. No.: 125,997

Related U.S. Application Data

[63] Continuation-in-part of Ser. No. 764,825, Oct. 3, 1968, abandoned.

[30] Foreign Application Priority Data

March 25, 1968 France..............................68145315

[52] U.S. Cl....................99/355, 99/423, 99/443 C
[51] Int. Cl..............................................A47j 27/14
[58] Field of Search........99/355, 353, 354, 386, 423, 99/443

[56] References Cited

UNITED STATES PATENTS

| 2,542,265 | 2/1951 | Staples | 99/386 X |
| 2,899,914 | 8/1959 | Van Arsdell | 99/423 X |
| 3,225,716 | 12/1965 | Krooss et al. | 99/443 C X |
| 3,534,676 | 10/1970 | Rubino | 99/443 C X |

*Primary Examiner*—Billy J. Wilhite
*Assistant Examiner*—Arthur O. Henderson
*Attorney*—Robert E. Burns and Emmanuel J. Lobato

[57] ABSTRACT

An automatic cooking machine for restaurants, canteens, etc., comprises a line of cooking slabs movable in a closed vertical circuit and carrying the food to be cooked. Each of the slabs is pivotable about a horizontal axis transverse to the direction of movement of the slabs and displaced from the center of the slab in the direction of movement of the slab so that by turning a slab over, food can be transferred to an adjacent slab. Means is provided for applying heat to cook the food on the slabs and for delivering the cooked food onto service plates at another point of the circuit.

7 Claims, 14 Drawing Figures

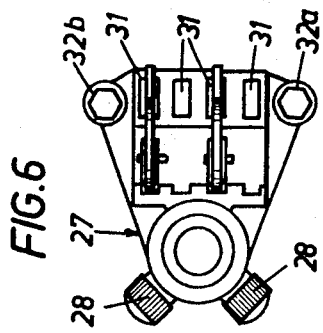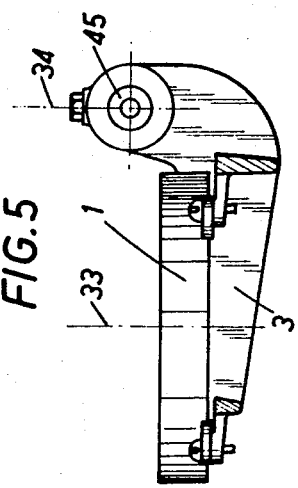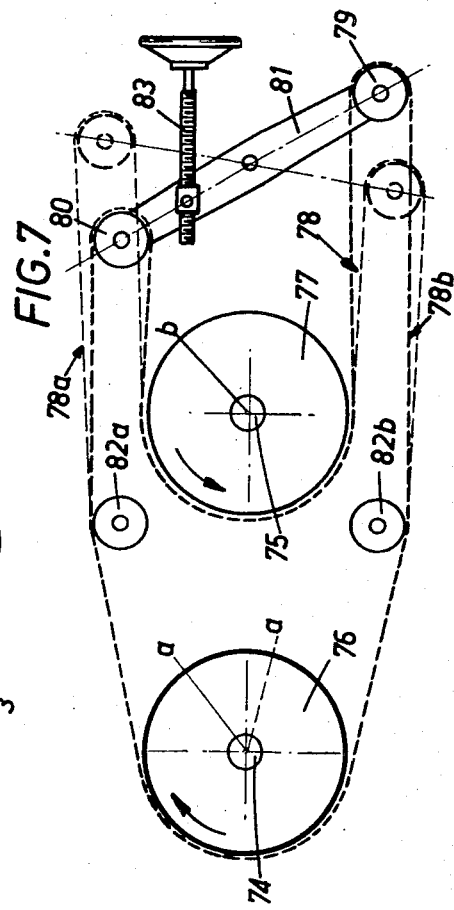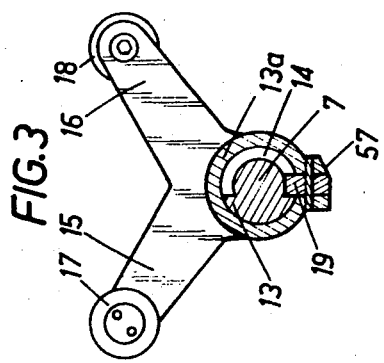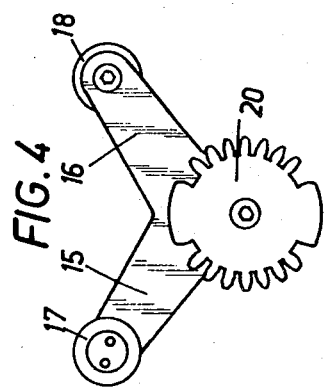

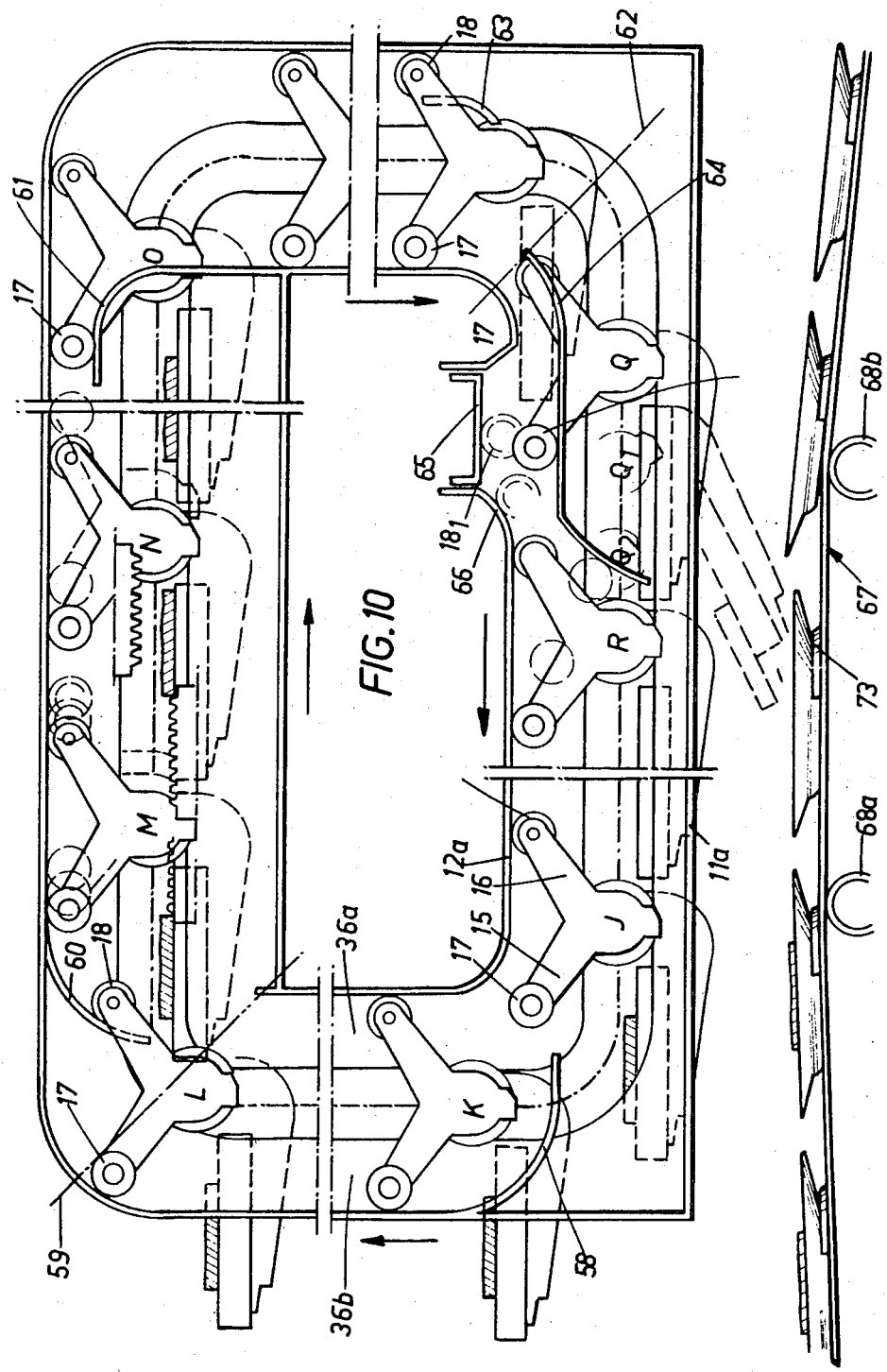

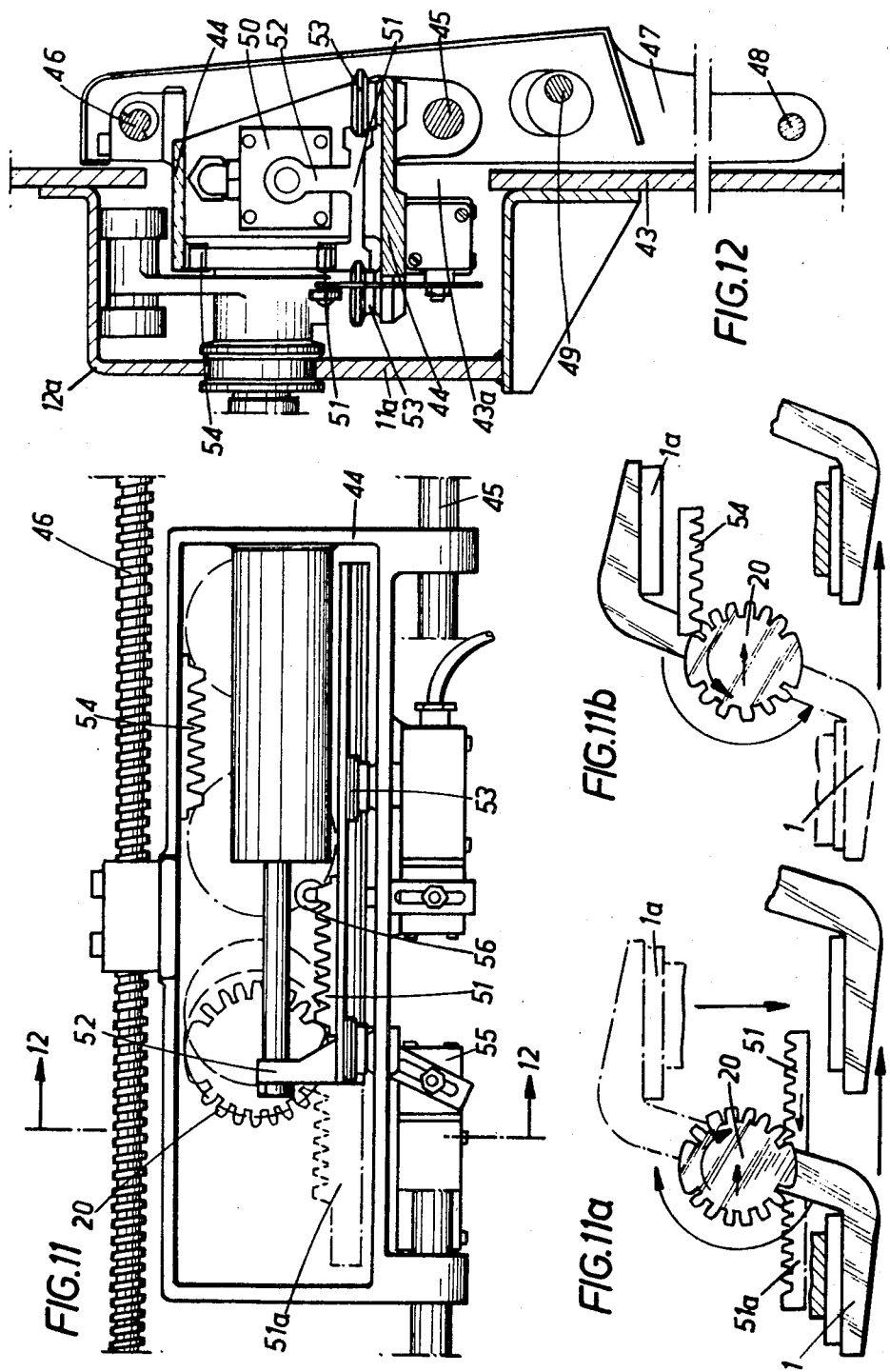

MACHINE FOR COOKING EGGS AND MINCED MEATS

CROSS-REFERENCES TO RELATED APPLICATIONS

This application is a Continuation-in-Part of application Ser. No. 764,825 entitled: "Machine for cooking eggs and minced meats," filed Oct. 3, 1968, now abandoned.

BACKGROUND OF THE INVENTION

The object of the present invention is to provide an automatic cooking machine intended for large restaurants or canteens.

This machine, of which the power-supply is automatic, cooks foods by contact on one or two sides, places them on plates, and garnishes the plates with vegetables, sauces, condiments, etc.

Because of its automation, it accepts only products having a constant and defined form, such as, for foods to be cooked: fried eggs omelettes, hamburger steaks, fish fingers, sausages, etc.; and for the garnishing foods: peas, beans, lentils, mashed potatoes or spinach, pea pudding, rice, noodles, salads, semolinas, jams, compotes, etc.

Canteens have to serve in a short period a large number of identical meals. Because of this, meals are prepared in the morning, kept warm and finally served. Certain foods, such as fried eggs or seasoned meats, cannot be subjected to this treatment. Furthermore, the work is complicated by the garnishing of the meals and their delivery in two operations and all the work involved is long because it is carried out by hand.

SUMMARY OF THE INVENTION

With the machine of the invention, the same work is carried out in short time, just before the meal is served, and at one time, without manual interruption either for the preparation as such or the placing of the cooked foods on the plates.

The invention is characterized by:
1. Means for cooking by contact, such as heating slabs or plates. These slabs can be grouped in line, heated electrically and thermostatically regulated.
2. Means for transporting these cooling elements. For example, each of the cooking elements is pivoted between two lines of chains slowly moving along a closed circuit of rails and guides.

The cooking time of foods is ensured by the time the foods remain on the slabs.

The loading and unloading of the mentioned foods takes place at determined points of the circuit.

3. Means for turning the slabs, for example, about their pivot axles on their chassis so as to effect:
    either the turning of the food by making it pass from one slab to that placed immediately below, during the descent on a vertical path or placed immediately in front during a horizontal path;
    or the transfer by turning over or by sliding of the cooked food onto the plates passing under the line of slabs.
4. Mechanical controls disposed along the circuit, for causing or preventing the turning over, or others for regulating the angle of discharge of the foods during the course of or at the end of the cooking.
5. Appropriate means for the distribution of foods to be cooked, having of capable of taking defined and constant forms, and, by way of example: omelettes, fried eggs, hamburger steaks, fish fingers, these means being interchangeable and movable.

BRIEF DESCRIPTION OF THE DRAWINGS

Other characteristics and particularities of the invention will appear on reading this description with the accompanying drawings in which:

FIG. 3 is a cross section along line 3—3 of FIG. 1.

FIG. 4 is a view from the right of the end part of a cooking element.

FIG. 5 is a cross-section along line 5—5 of FIG. 1.

FIG. 6 is a view from the right of the connector, without the axle.

FIG. 7 shows schematically a means for regulating the position of the plates with respect to the cooking line.

FIG. 10 is a schematic profile of the cooling line, taken

FIG. 11 is a face view of a turning means with screw-jack actuation.

FIGS. 11a and 11b schematically show the turn-over operation of a cooking slab and, FIG. 12 is a cross section along 12—12 of FIG. 11.

DESCRIPTION OF THE PREFERRED EMBODIMENT

This machine for cooking eggs and minced meats comprises an endless chain conveyor cooking line (FIG. 10) running clockwise and disposed above a conveyor for plates. Loading takes place in the horizontal lower part before the left lower elbow; turning of the product at any point of the horizontal upper part between the upper elbows; and unloading in the horizontal lower part following the right lower elbow.

Figure 1:
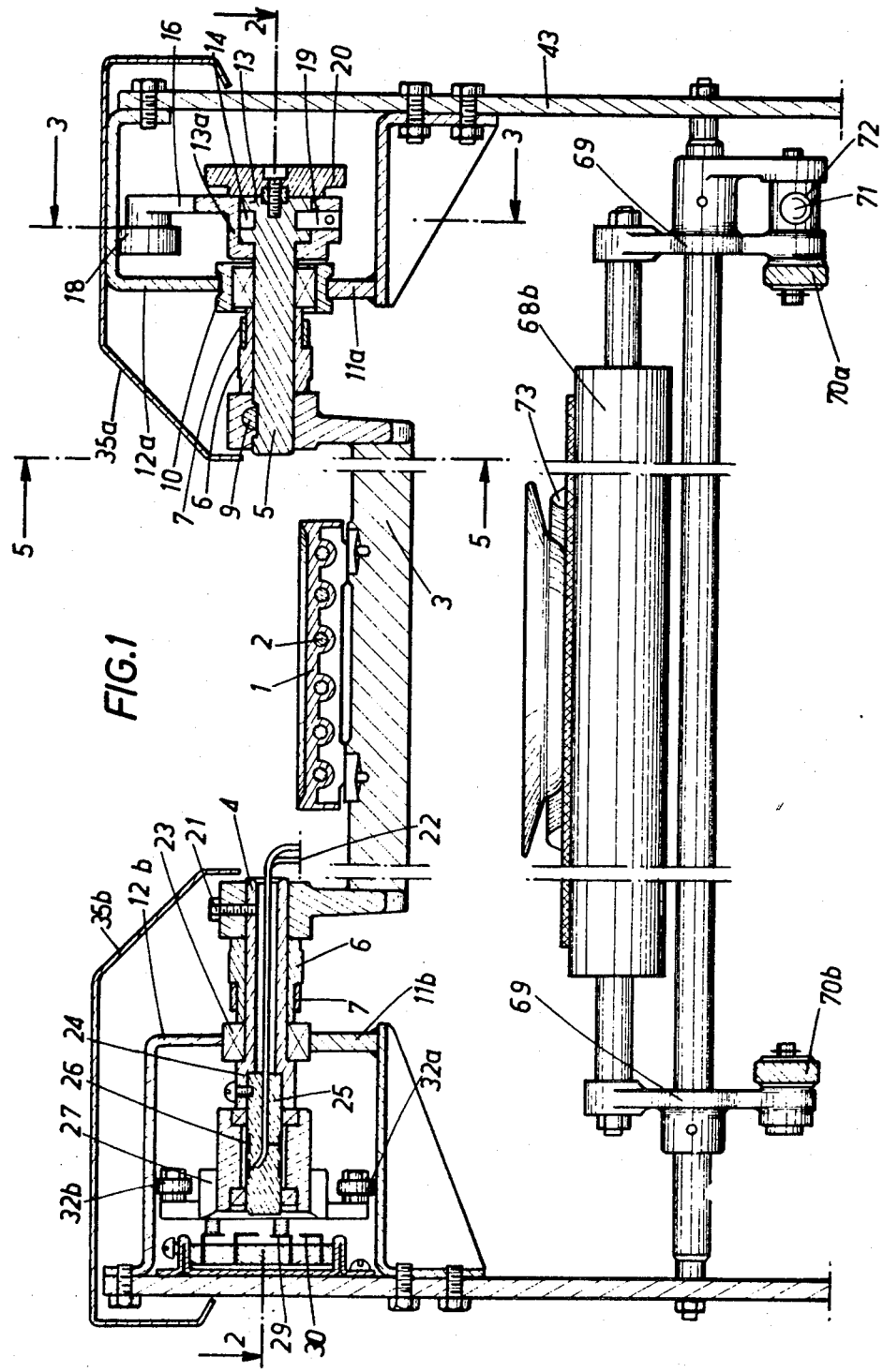
FIG. 1 shows a cross-section taken along line 1—1 of FIG. 2 of a cooking element disposed on the lower rail of a circuit.
Figure 2:
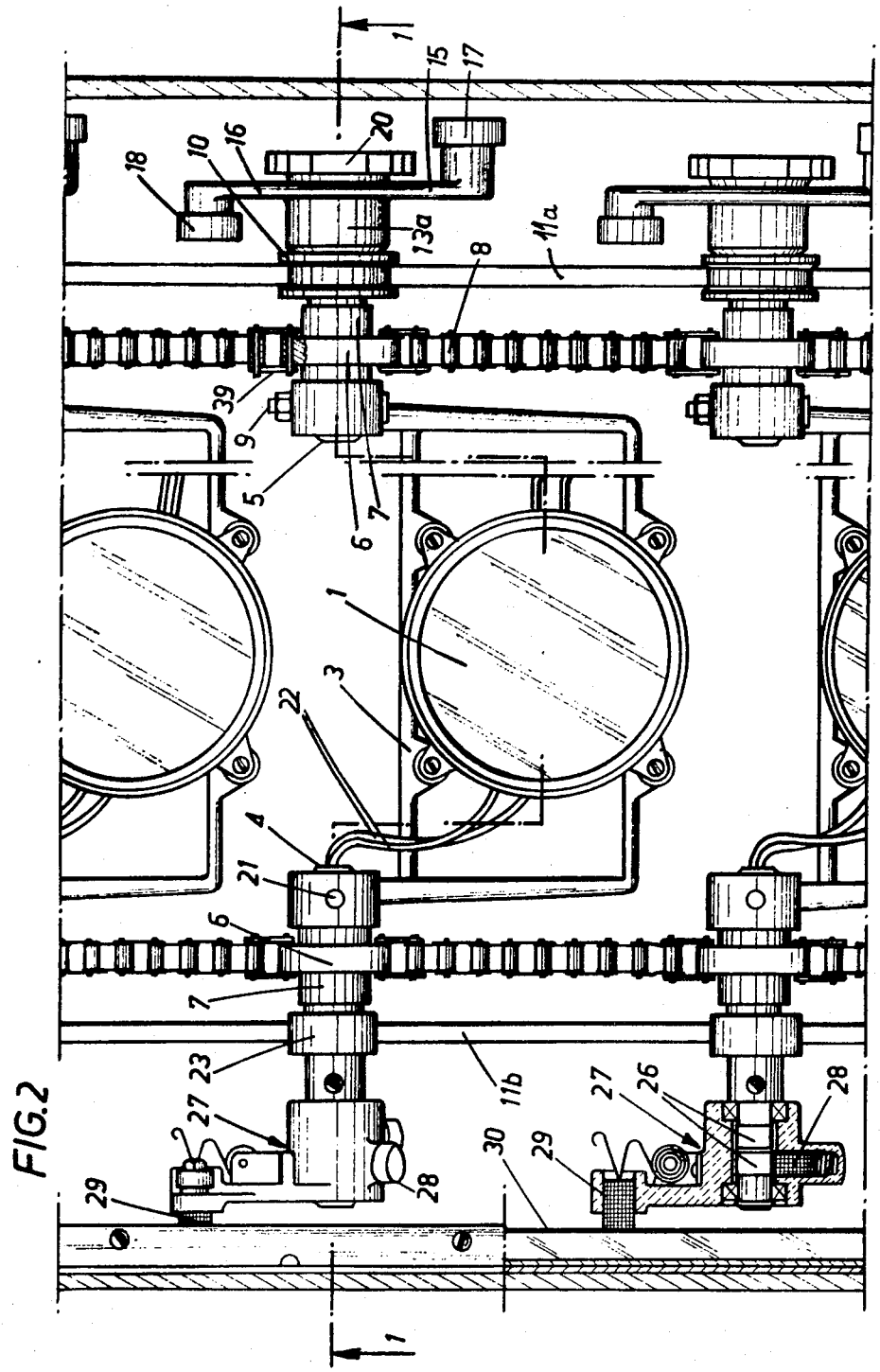
FIG. 2 is a plan view of a part of a line of cooking elements disposed on a horizontal rail (partial section along line 2—2 of FIG. 1).

Each cooking element, (FIGS. 1 and 2), is formed by a hollow aluminum slab 1, of which the work surface is provided with an antiadhesive coating, and is resistant to the normal cooking temperature. Heating elements 2 are casted in the same piece. The slabs are fixed to a frame of cast aluminum 3.

The number of slabs per frame is variable according to the capacity of the machine. One of the slabs has a thermostat and the electrical connection allows power supply to all of the slabs of one frame from this thermostat.

The number of frames depends on the average time of cooking eggs or meat and the translational speed.

Frames 3 have two axles 4 and 5 of which one, 4, permits the passage of current and the other, 5, controls the rotational movements to which the frames are submitted. Each of these axles is journaled in a piece 6 carrying a roller 7. These pieces 6 receive the extremities of chain-links 8. Axle 5, firmly solid with frame 3 by means of a split pin 9, carries a shouldered roller 10 intended to roll on and between rails 11a and 12a. The extremity of the axle 5 has a shoulder 13 in which is provided a semiperipheral slot 14 (FIG. 3).

Around this shoulder 13 pivots a hub 13a comprising two arms 15 and 16 each carrying a roller 17 and 18 disposed on either side of the arms. This hub 13a which comprises a lower ramp 57 (FIG. 3), is limited, in its rotational movement about axle 5 shouldered at 13, by a projection 19 engaging in the slot 14 and coming into abutment against the extremities of said slot. The disposition is such that the cooking slabs 1 are maintained approximately horizontal or reversed, when the projection 19 is in abutment; the two rollers 17 and 18 being maintained on a horizontal plane.

Finally, a toothed wheel 20 is wedged on the shoulder 13, its profile being represented in FIG. 4.

Axle 4, fixed to the frame 3 by a small cylindrical screw 21, is hollow to allow passage of electrical conductors 22. Apart from the journal piece 6 and roller 7 corresponding to members 6 and 7 respectively for axle 5, it carries a roller 23, intended to roll on and between rails 11b and 12b. Its extremity 24 is extended by a second axle 25 of thermo-resistant insulating material. In this axle 25 are embedded conductors 22 which are joined to two copper collecting rings 26 themselves inserted during casting of said axle.

On this insulating axle 25 is pivoted a connector 27 possessing on the one hand two brushes 28 rubbing against the rings 26 and on the other hand two brushes 29 rubbing against current-carrying rails 30. These brushes are disposed in two of the four cavities 31 such that the electric power absorbed by the assembly of the cooking line is divided as well as possible over the three phases of a three-phase power supply.

Brushes 28 are electrically connected to brushes 29 by connections embedded in connector 27.

The carbon brushes 29 always remain correctly centered on rails 30 thanks to two rollers 32a and 32b bearing against the sides of rails 11b and 12b.

The central axis 33 of the slabs is off-set rearwardly of the pivoting transverse axis 34 (FIG. 5) so that upon pivoting an assembly the slabs are situated above those of the preceding assembly.

Rails 11a, 12a and 11b, 12b are disposed in such a manner that no access is possible either to the mechanical or electrical parts.

The rollers 10 and 23 provided on each assembly roll on the horizontal parts of a rail 11a or 11b, and are counter-guided by rail 12a or 12b.

Figure 9:
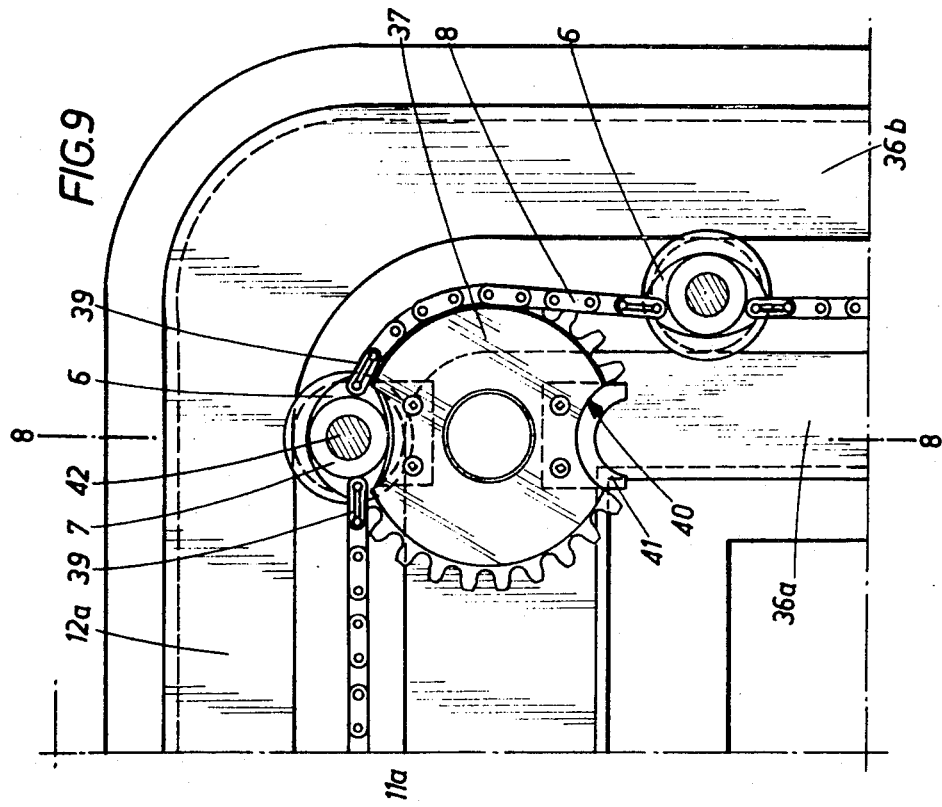
FIG. 9 is a view from the left of FIG. 8 along line 9—9.
Figure 8:
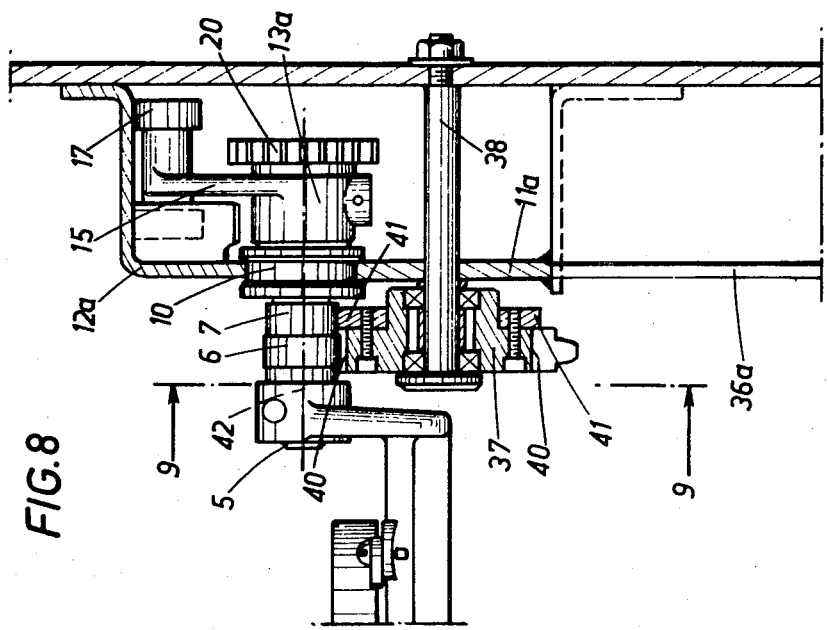
FIG. 8 is a section along line 8—8 of FIG. 9.

In the vertical parts (FIG. 9) these two rails serve as guides 36a and 36b. At the angles, the chains engage on sprockets 37 pivoted on axles 38. One of the roles of the sprockets is obviously driving the chains. The journal pieces 6 are connected to the extremities of chains 8 by joining links 39.

The spacing of the attaching holes of the journal pieces 6 corresponds to a whole number of chain links (for example 3) so that the sprockets 37 have a whole number of teeth and are of a standard type.

For this machine, separation of frames: 13 links; separation of attaching holes: 3 links.

Number of teeth of sprockets: 2 × 13 teeth, equals 26 teeth.

An arcuate recess 40 in the sprocket corresponds to the position of the journal piece 6. Cradle 41 on the sprocket can receive roller 7 while it describes the arc of the circle corresponding to the elbow. The axis 42 of said piece 6 and roller 7 is placed on the root diameter of sprocket wheel 37 and not in line with the chain, so that movement in the arc of a circle joins up perfectly with straight lines. The difference between the arc and the chord is negligible for the length of arc of 3 links, for 26 links circumference, even more so since the general disposition only permits passage of a single assembly of slabs at a time on one of the four sets of sprockets.

In the upper horizontal part, one of the sides of the machine 43 is pierced by an opening 43a along the entire length of the straight line, the opening being at the right of the rails 11a and 12a (FIGS. 11 and 12). In this opening a cast cage 44 is slidable on a cylindrical horizontal guide 45 by an endless screw 46. This latter is manoeuvred by hand to allow adjustment of the longitudinal position of the cage 44. The guide 45 and screw 46 are fixed at their extremities in two bars 47 pivoted at 48 in the lower part of the machine. They approach or are removed from the frame by two eccentrics 49 and thereby move the cage 44 between an active and inactive position.

In this cage, is disposed a longitudinal hydraulic jack 50 the source of energy of which is taken from the water mains supply. The end of this jack acts on a rack-gear 51 by interposition of arm 52. This rack-gear comprises a base which is movable by rollers 53.

A second rack-gear 54 is provided in the upper part of the cage.

Two roller electric contacts 55 and 56 are disposed in such a way that their rollers bear on the ramps 57 (FIG. 3) upon passage of the cooking assemblies in front of cage 44. These contacts feed electrovalves admitting water under pressure into jack 50.

When a pinion 20 comes into contact with the rack-gear 51 (FIG. 11a), it tends to enter into clockwise rotation and to force the cooking slabs into a turning over clockwise movement. As soon as engagement has commenced, the contact 55 closes and pressure is admitted at the foot of the jack. The rack-gear 51 is displaced to the left position 51a effecting clockwise pivoting by a half revolution of the pinion and thus the cooking slabs into the upper inversed position 1a (FIG. 11a). The pinion continues its horizontal way to the right until it reaches the position illustrated in FIG. 11b where it engages on the upper rack-gear 54 at its own displacement speed to become relocated at its starting position by counterclockwise rotation.

During the first clockwise turning over of the slab, the product it contains (hamburger or croquette) remains placed against the cooking surface by its inertia. However, it tends to leave it because of the effect of the "centrifugal force." So as to exactly centralize the position of the product, the speed of turning over is adjustable by the output of the electrovalve feeding the foot of the jack. Furthermore, this has shock absorbers at the end of the trajectory so that the starting is progressive and the stopping does not provoke a shock. During the time of stopping in the turned-over position, the product is placed on the preceding slab, which had accomplished the same movement and re-adopted its normal position.

By displacing cage 44, by means of the endless screw 46, it is possible to effect the turning over at any point whatsoever of the upper straight line.

By manoeuvring the eccentrics 49 it is possible to disengage the racks from the passage of the pinions so as not to effect turning-over of the slabs.

In the case where, by inadvertence, the cooking line is put into action without opening the water supply to the jack 50, it is necessary that the pinions are not to be located so as to be simultaneously engaged with the two racks 51a and 54. To this end, their disposition is such that a pinion 20 engaging in the rack 51 at its speed of passing is freed before coming into contact with the second rack 54.

Otherwise, it is necessary that the return, effected by the action of ramps 57 on the contact roller 56, occurs only before a new pinion 20 comes into engagement with the rack 51 when it is placed at 51a.

The cooking circuit is disposed such as shown in FIG. 10 and moves as indicated by the arrows.

In the lower horizontal part, for an assembly J, for example, the roller 18 takes support permanently under the bend of rail 12a, maintaining the slabs horizontally.

At the approach to the left lower elbow, the roller 17 comes to bear upon the counter-rail 58 which, evidently, is situated in front of the plane of arms 15, 16. The elbow is thus passed by the support of this roller.

In the vertical part, for an assembly K, for example, it is always the roller 17 which takes support on the rail 36b.

In the left upper elbow, and for an assembly L, for example, before this reaches the bisector of the angle 59, the roller 18 comes into support under the counter-rail 60, so that the assembly crosses the critical point of the bisector. In effect, in this area, the return of rail 36b is in the same plane as the effort attracting the roller 17 (that is, in the direction of the arrows).

In the upper horizontal part, and for assemblies M or N for example, equilibrium is realized as in the lower part. During turning over, it is clear that only the racks take the weight of the slabs.

In the right upper elbow, and for an assembly O, for example, it is roller 17 which takes support against the counter-rail 61.

In the right lower elbow, and for an assembly P, for example, the crossing of the bisector of the elbow 62 is achieved in two actions. A first counter rail 63 takes the weight of the roller 18 during passage through the bisector; then, since this counter-rail 63 cannot be extended because of the passage of the hubs, a second counter-rail 64 takes the weight of the roller 17 until the time when the roller 18 can rest once more under the return of rail 12a.

Following this elbow, and for an assembly Q, for example, the counter-rail 64 drops sharply away from the support of roller 17 so as to effect a rapid pivoting of the slabs following contour Q1. This pivoting is limited by the support of roller 18.1, under flange 65 which is adjustable in height so as to regulate the pivoting angle.

Continuing its path, the assembly Q will continue to take support on the flange 65 until its roller 18.2 meets ramp 66, at location Q2. This ramp rapidly rights the assembly which continues its way following R, so as to receive a new load for cooking.

During the rapid pivoting, the meals at the end of cooking on the slabs of this assembly Q slide onto the plates passing underneath.

It is necessary, since the angle of tilting is adjustable, that the height of belt 67 supporting the plates is also adjustable. To this end, two rollers 68a and 68b support the belt. They pivot about the extremities of the arms of levers 69 (FIG. 1) which are connected, two by two, by a deformable parallelogram system 70a and 70b which is drawn by an endless follower nut 71, turning in a screw 72.

So that the plates are exactly positioned on the belt, this is provided with circular projections 73. The plates are either placed by hand at the entry of the belt for machines of small capacity or placed automatically by mechanical means disposed at the entry of the belt (supply means taking plates from the bottom of a pile).

According to the inertia of the product and its coefficient of friction, it is necessary that the plates (and likewise the projections 73), are correctly in front of the product at the moment this leaves the cooking slab.

The movement of the belt (FIG. 7) is taken from axle 74 and that of the cooking line from axle 75. The axle 75 is driven by a variable speed motor.

The cooking line and the belt, for the present machine, move at the same speed, but could have different speeds. The mechanical coupling of these two axles 74 and 75 is achieved by two sprocket wheels 76 and 77, upon which engages a chain 78. This is taken up by two take-up sprockets 79 and 80 fixed to a balance arm 81. Two auxiliary take-ups 82a and 82b separate the chain and the sprocket wheel 77.

With the balance arm 81 stationary, the sprocket wheels 76 and 77 turn at the same speed in fixed phase relation. If the balance arm 81 is inclined by means of screw 83, the chain 78a lengthens at the expense of chain 78b and because this, the sprocket wheel 76 takes an advance over the sprocket 77. The sprocket wheel 76 then turns at the same angular speed as sprocket wheel 77 but with a certain angle of advance.

The belt, driven by axle 74, is thus advanced with respect to the cooking line, this adjustment being possible during operation.

The food distribution organs are mechanically linked to the machine whilst remaining easily de-couplable and re-couplable, and preserving their adjustment with respect to each other.

These power take-offs are directly linked to the axle 75 for those intended for the distributors of food-to-be-cooked and directly to axle 74 for these intended for the distributors of garnishings. These latter thus remain adjusted when the belt of plates under the cooking line is adjusted.

Of course, the invention is not limited to be described example but on the contrary embraces other variants of embodiments.

Apart from the relative disposition of the members and their material, it is possible to produce machines carrying out the same functions by different means.

The principal advantage of the present invention is to be able to automatically cook and adorn simple meals based on eggs or minced meat, directly onto the serving plates, without the need for a labor force, etc. just before or during meal hours.

What we claim is:

1. Automatic food cooking machine comprising a line of cooking slabs movable in a closed vertical circuit and carrying the food to be cooked, conveyor means for moving said slabs around said circuit comprising an endless chain conveyor movable along said closed vertical circuit and having first and second parallel chains, coaxial first and second horizontal transverse axles connecting each slab to said first and second chains respectively, the common axis of said first and second axles being off-set forwardly with respect to the center of the slab for pivoting each of said slabs about a horizontal axis transverse to the direction of movement of the slabs and displaced from the center of the slab in the direction of movement of said slab whereby slabs can be turned over and food on one slab can be transferred to an adjacent slab, guide rails extending along the path of said slabs, rollers carried by said first and second axles and bearing on said guide rails, means for pivoting said slabs about said common axis, means for applying heat to cook said food on said slabs, said heat applying means comprising electrical heating means in each of said slabs, current feeding rails extending along one side of the path of said slabs and means carried by said first axle for connecting said electrical heating means with said current feeding rails, and means for delivering the cooked food onto service plates at a delivery point of the circuit.

2. Machine as claimed in claim 1, wherein said means for pivoting each of said slabs about an horizontal transverse axis comprise a pinion carried by said second axle, a cage located on the external side of the horizontal path of said slabs, a longitudinal horizontal jack carried by said cage, a lower movable rack actuated by said jack and engaging the lower part of the pinion carried by said second axle of each slab, an upper fixed rack carried by said cage and engaged by the upper part of said pinion, and first and second electrical contacts carried by said cage and successively actuated by each second axle and controlling the actuation of said jack in both directions respectively.

3. Machine as claimed in claim 2 comprising means for adjusting the longitudinal position of said cage and consequently the point of the circuit where the pivoting of the slabs takes place.

4. Machine as claimed in claim 1, wherein said delivering means comprises means for pivoting said slabs about a horizontal axis at the delivery point of the circuit, whereby the contents thereof can be placed into service plates.

5. Machine as claimed in claim 4, comprising means for the adjustment of the angle of tilt of said slabs at said delivery point during operation of the machine.

6. Machine as claimed in claim 1 comprising a belt moving under said line of cooking slabs and whereon said service plates are located.

7. Machine as claimed in claim 6 comprising means for adjusting the space between said belt and said line of cooking slabs.

* * * * *